Figure 1:
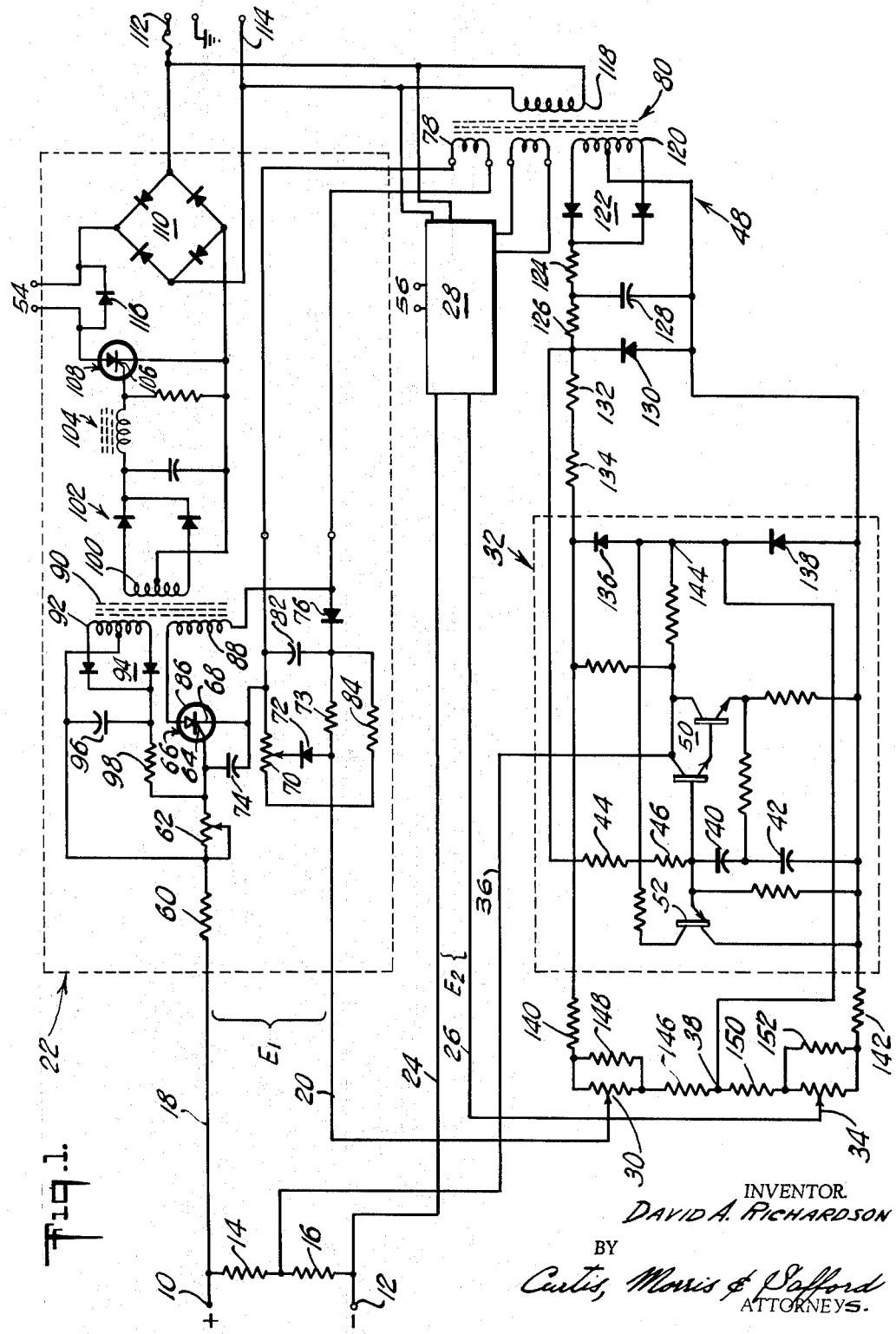

INVENTOR.
DAVID A. RICHARDSON
BY
Curtis, Morris & Safford
ATTORNEYS.

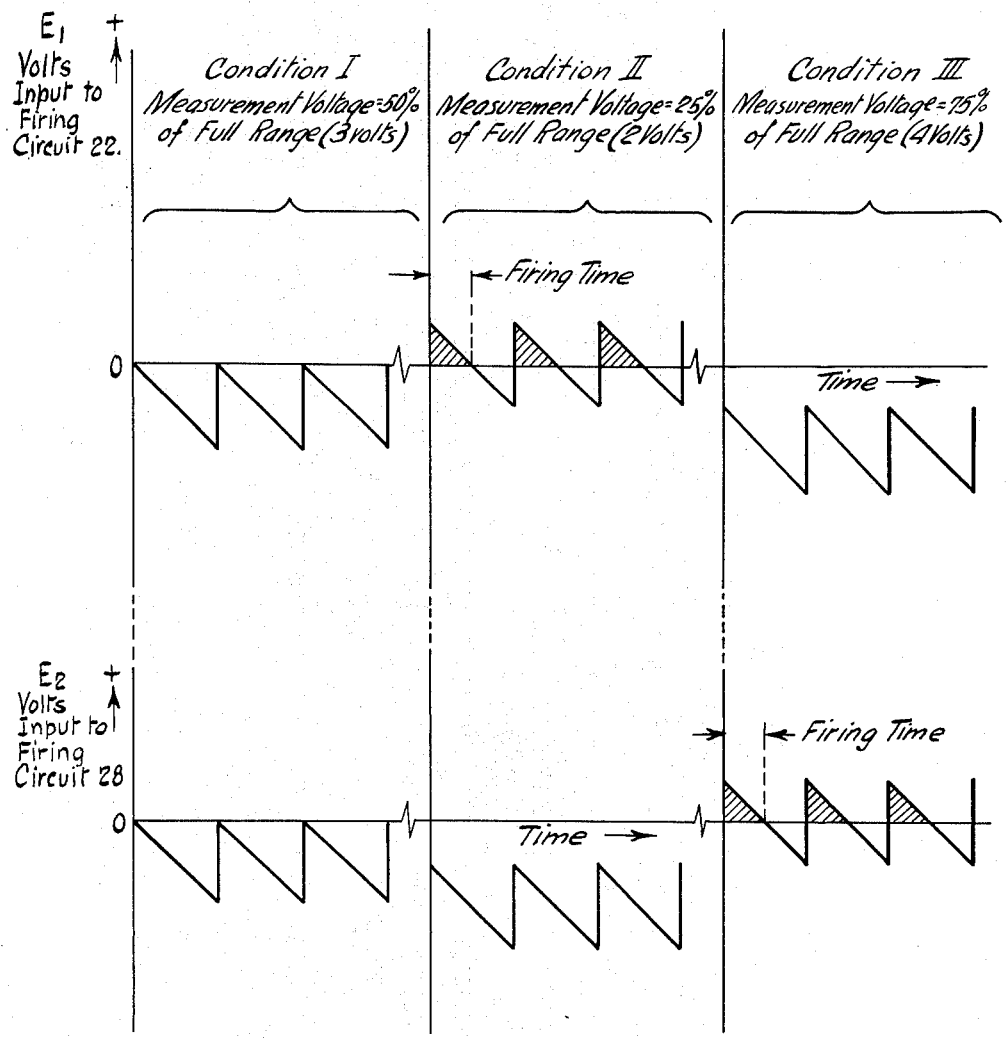

United States Patent Office 3,231,760
Patented Jan. 25, 1966

3,231,760
ELECTRICAL SIGNAL RESPONSIVE APPARATUS FOR USE WITH INDUSTRIAL PROCESS INSTRUMENTATION SYSTEMS UTILIZING SCR ELEMENT
David A. Richardson, Sheldonville, Mass., assignor to The Foxboro Company, Foxboro, Mass.
Filed Feb. 1, 1963, Ser. No. 255,596
6 Claims. (Cl. 307—88.5)

This invention relates to electrical control apparatus especially useful in industrial process instrumentation systems. More in particular, this invention relates to improved electrical means for producing a control action when an electrical input signal reaches a predetermined magnitude.

In an illustrative embodiment of the invention described hereinbelow in detail, there is provided a solid-state controller adapted to receive a measurement signal in the form of a current proportional to a measured process condition (e.g., a temperature or pressure), and to produce an output reflecting both the direction and extent of the deviation of the measured process condition from a desired value. This controller includes two independent "firing circuits," one arranged to produce an output signal whenever the measured condition equals or exceeds a preset value, and the other arranged to produce an output signal whenever the condition equals or falls below a preset value. The output signal consists of periodic timed bursts of current pulses, each of the bursts having a time duration proportional to the difference between the measured process condition and the preset level.

One application for a controller of this type is in certain processes in the paper industry where it is necessary to adjust very precisely the spacing between a pair of mechanical elements in accordance with variations in a measured differential temperature. For this purpose, the two output signals of the controller may be directed respectively to two drive motors, one for moving the elements toward one another and the other for separating them. Whenever the differential temperature exceeds a given level, the controller will energize one of the drive motors, and whenever the differential temperature drops below a given level, the controller will energize the other drive motor.

It is a broad object of this invention to provide a process controller which will quickly and accurately detect and correct deviations of a process condition from a desired level.

One problem met in many process control systems is that, when they are adjusted to provide the required close control of the process condition, they tend to "overcorrect" in responding to an error. That is, they tend to return the measured condition past the desired level so that the controller must then supply additional corrective signals in order finally to set the condition at the desired level.

Accordingly, an object of this invention is to provide a process controller which produces a minimum amount of overcorrection and therefore allows for relatively close control of process conditions.

In controllers used to correct deviations of a process condition both above and below a preset level by energizing motors or other mechanical equipment, it is undesirable to maintain the drive apparatus energized at all times because this unnecessarily increases the wear on the equipment and wastes electric power. Accordingly, another object of this invention is to provide a process controller which activates the drive motors only when the controlled condition deviates from the desired level by a predetermined amount.

The embodiment of this invention illustrated hereinbelow uses one or more semiconductor devices to control its output. The electrical characteristics of such semiconductors often change substantially with changes in the temperature at which the semiconductors are operated. These changes cause corresponding errors in operation of the controller unless they are compensated for.

Accordingly, another object of this invention is to provide a novel arrangement for compensating for errors caused by changes in the operating temperature of process controllers using semiconductor devices.

It may also be noted that the firing circuits to be described hereinbelow are adapted for use individually in other applications where it is necessary to produce an output signal whenever an input signal reaches or exceeds a predetermined level. For example, these circuits are especially suited for use in alarm devices which produce a warning signal by ringing a bell or turning on a light whenever a measured process condition reaches or exceeds a preset value. These circuits also include means to maintain the output activated until the input signal has dropped back a preset amount below the predetermined level, e.g. to assure that the warning device will not be turned off by a small fluctuation in the measurement signal.

Therefore, it is a further object of this invention to provide improved electrical apparatus for producing an output signal when an input signal reaches or exceeds a predetermined value.

Other objects, aspects and advantages of this invention will in part be pointed out in, and in part apparent from, the following description considered together with the accompanying drawings, in which:

FIGURE 1 is a schematic diagram showing the interconnection of the elements of a preferred embodiment of the invention; and FIGURE 2 is a chart showing the variation with time of the voltages applied to the firing circuits of the embodiment of FIGURE 1.

Referring now to FIGURE 1, there is shown a pair of input terminals 10 and 12 adapted to be connected to a transmission line carrying a direct current proportional to a measured process condition, for example a current in the range of 10 to 50 milliamps developed by any one of a variety of commercially available transmitter units. This current is directed through a pair of series-connected 100 ohm resistors 14 and 16 each of which develops a corresponding measurement voltage whose value ranges between 1 and 5 volts and therefore has a full scale range of 4 volts.

Input terminal 10 is connected to a lead 18 which, together with a lead 20, carries the input voltage $E_1$ for a first firing circuit generally indicated at 22. Similarly, input terminal 12 is connected to a lead 24 which, together with a lead 26, carries the input voltage $E_2$ for a second firing circuit generally indicated at 28 and identical to firing circuit 22. Since firing circuit 28 is identical to circuit 22, circuit 28 is shown only as a block element in the circuit diagram.

The voltage $E_1$ applied across the input leads 18, 20 of the first firing circuit 22 consists of the algebraic summation of the measurement voltage across resistor 14, a set point voltage fed from a potentiometer 30, and a periodic "ramp" voltage (i.e. an alternating voltage having a sawtooth waveform) developed by a ramp generator generally indicated at 32. Similarly, the voltage $E_2$ applied across the input leads 24, 26 of the lower firing circuit 28 consists of the algebraic summation of the measurement voltage across resistor 16, a set point voltage fed from potentiometer 34, and the periodic ramp voltage developed by the ramp generator 32.

The ramp generator 32 is a conventional circuit adapted to produce between its output lead 36 and a common point 38 (between the set point potentiometers 30 and 34) a voltage having a sawtooth wave form. This voltage varies linearly from zero to 2 volts over a period of 10 seconds and repeats this variation during each succeeding 10 second interval. For this purpose, the ramp generator includes a pair of capacitors 40 and 42 which charge up slowly through resistors 44 and 46 connected to a D.-C. power supply generally indicated at 48, the resulting gradually increasing voltage being fed to a pair of transistors 50 which include feedback circuitry to produce on output lead 36 a linearized sawtooth signal of substantial power. When the voltage of the capacitors has reached a predetermined maximum level, a unijunction transistor 52 starts to conduct, and the capacitors are thereby rapidly discharged to permit another cycle to start. Details of a circuit of this type may be found in the General Electric Transistor Manual, 6th edition (1962), at page 196.

If the magnitude of either of the varying input signals is such that the voltage applied ($E_1$ or $E_2$) to either of firing circuits 22 and 28 is negative, that firing circuit will not be activated. However, as will be explained hereinafter in more detail, when the voltage applied to either firing circuit reaches zero or goes slightly positive, that firing circuit will be activated to produce output currents through the respective output circuits indicated at 54 and 56.

Since the voltages $E_1$ and $E_2$ include linearly varying components developed by ramp generator 32, the length of time either one of the firing circuit 22 or 28 produces an output current will depend upon the relative magnitude of the respective measurement and set point signals, i.e. the voltages across resistors 14 and 16 and the voltages picked off by potentiometers 30 and 34. This relationship is illustrated more clearly in FIGURE 2.

If the various voltages have the values shown in Condition I of FIGURE 2, the measurement and set point signals both will be equal to 3 volts (indicating that the measured condition is at the desired value), the voltages applied to both firing circuits will be identical, and, due to the presence of the ramp voltage as a component, will consist of negative sawtooth waves which start at or slightly below zero potential and end at minus 2 volts. Thus, there will be no activation of either of the firing circuits.

In the example designated as Condition II in FIGURE 2, the measurement signal is 2 volts (25% of the full scale range of from 1 to 5 volts) and the set point signal is 3 volts (50% of full scale range). $E_1$ therefore varies with the 2 volt ramp signal between plus one and minus 1 volt, while $E_2$ will vary between minus 1 and minus 3 volts. Thus, the first firing circuit 22 will be activated during the first half of each cycle, while the second firing circuit 28 will remain inactive.

In Condition III of FIGURE 2 the measurement signal is 4 volts (75% of full scale range) and the set point signal is 3 volts. $E_1$ therefore varies between minus 1 and minus 3 volts and $E_2$ will vary between plus 1 and minus 1 volt. Accordingly, the second firing circuit will be activated during the first half of each cycle, while the first firing circuit will remain inactive.

From these examples it can be seen that in the circuit shown in FIGURE 1, a decrease of the measurement voltage from the set-point voltage drives $E_1$ in a positive direction and $E_2$ in a negative direction, thus activating firing circuit 22 to produce an error signal at terminals 54. Conversely, when the measurement voltage increases above the set-point level, $E_2$ increases and $E_1$ decreases, firing circuit 28 is activated, and an error signal is produced at terminals 56. These error signals may be used to drive motors, sound alarms, or otherwise produce useful energy.

As mentioned hereinabove, the two firing circuits 22 and 28 are identical, and accordingly only the first firing circuit 22 will be described in detail, it being understood that this descriptive material applies equally to the second firing circuit 28.

Referring now to firing circuit 22, the input lead 18 is connected through a fixed resistor 60 and a variable resistor 62 to the control electrode 64 of a silicon controlled rectifier 66 (e.g. of the type known commercially as 3N58, 3N59 or 3N60, and referred to hereinafter as "SCR"). The control circuit for this SCR is completed from its negative electrode 68 through a potentiometer 70 and a silicon diode 72 to the other input lead 20. A capacitor 74 is connected between the SCR electrodes 64 and 68 to filter out unwanted noise spikes and the like.

The diode 72 is supplied with a small direct current (e.g. 10 to 20 microamps) by a circuit including a resistor 73 and a rectifier 76 which is energized from a secondary winding 78 of a power transformer 80. A capacitor 82 serves to filter this direct current supply. The rectifier 76 also supplies direct current to a resistor 84 and the potentiometer 70, in order to establish a biasing potential between the diode 72 and the SCR electrode 68.

SCR 66 requires only a very small current (e.g. about 1 microampere) through its control electrode to cause it to fire, and this required current does not vary significantly with changes in temperature of the SCR. However, the voltage that must be applied to the control electrode to produce this firing current does vary significantly with temperature. Therefore, unless steps are taken to prevent it, the voltage at which firing circuit 22 is activated would vary with changes in temperature. In accordance with one aspect of the present invention, however, this difficulty is avoided by the compensating diode 72 and associated circuitry.

In more detail, it has been found that the voltage drop across a silicon diode varies with temperature in much the same way as does the firing voltage for the SCR. Thus, the diode 72 serves to compensate for changes in the firing voltage of the SCR. For example, if the required firing voltage drops by 50 millivolts due to a change in temperature, the biasing voltage across the diode 72 also will drop by essentially 50 millivolts due to this same change in temperature. Accordingly, the SCR will fire at the same value of $E_1$ regardless of changes in temperature.

The potentiometer 70 introduces a further biasing voltage into the firing circuit for the SCR for the purpose of causing the SCR to fire when the applied voltage $E_1$ reaches or slightly exceeds zero. In a typical circuit arrangement of the type described herein, the required firing voltage between electrodes 64 and 68 will be about 500 millivolts. This firing voltage is supplied by a voltage drop across the diode 72 of about 400 millivolts plus an additional voltage drop of about 100 millivolts across potentiometer 70.

The compensating diode 72 also serves to limit the firing current flowing through the control electrode 64 of the SCR 66, since this firing current can never exceed in magnitude the bias current flowing in the forward direction through diode 72 from the rectifier 76. If the firing current exceeded the forward current through diode 72, there would have to be a net current in the reverse direction through this diode, and since the rectifying action of the diode prevents such reverse current flow, it is evident that the control electrode firing current will be limited to a value equal to the normal forward flow of current through the diode. This forward flow of current through the diode is adjusted to a proper level (e.g. to 20 microamps) by the proper selection of the resistor 73, and the potentiometer 70 then is adjusted to assure that the sum of the voltage drop across the diode 72 and the biasing voltage picked off by the potentiometer will be equal to the firing voltage required for the SCR 66.

When the applied voltage $E_1$ reaches zero and goes slightly positive, the SCR 66 will fire and thereby present a very low resistance to the flow of current from its positive electrode 86 to its negative electrode 68. The current flow consists in this case of timed bursts of half-wave pulses of current supplied by the secondary winding 78 of the power transformer 80. The duration of these bursts is a function of the magnitude of the difference between the set-point and measurement voltages.

The half-wave current pulses of each burst are fed through primary winding 88 of an output transformer 90 and induce a corresponding A.-C. signal in a secondary winding 100 of transformer 90. This A.-C. signal is converted to a direct-current signal by a full-wave rectifier 102, and the resulting D.-C. signal is directed through an LC filter 104 to the control electrode 106 of a power SCR 108. This latter SCR is connected in a conventional manner in series with the output circuit 54 and a ring (full-wave) rectifier 110 which is energized from conventional A.-C. power lines 112 and 114. Thus, when the control SCR 66 fires, the power SCR 108 conducts heavily to produce a substantial output current through the load. In the embodiment disclosed herein, the output power produced by SCR 108 is about 75 watts. A rectifier 116 may be bridged across the output circuit 54 to absorb reverse-polarity spikes such as might be caused by an inductive load such as a relay.

The half-wave output pulses flowing through output primary winding 88 of transformer 90 induce a corresponding A.-C. voltage in a feedback winding 92 forming part of this transformer. This induced voltage is applied to a full-wave rectifier circuit 94 to produce a D.-C. feedback signal which is filtered by a capacitor 96 and fed through a resistor 98 in series with the adjustable resistor 62. Accordingly, there is developed across resistor 62 a D.-C. voltage the magnitude of which is controlled by the setting of this resistor.

The polarity of the D.-C. voltage across resistor 62 is such as to make the control electrode 64 more positive with respect to electrode 68, i.e. this circuit provides positive feedback. Thus, once the SCR 66 has fired, this positive feedback circuit tends to maintain the SCR in firing condition so that it will not stop conducting due to minor variations in the applied voltage $E_1$. This circuit also provides a "continued firing" zone which, in the embodiment disclosed herein, is adjustable between about 0.5% and 10% of full scale range (4 volts in this case) by means of resistor 62. Thus, if the resistor 62 is set for a continued firing voltage of 0.5%, the SCR will fire when $E_1$ reaches zero, and will not stop firing until $E_1$ has dropped back at least to minus .02 volt. If the continued firing voltage is set at 10%, SCR 66 will not stop firing until $E_1$ has receded to minus 0.4 volt.

One advantage of this arrangement is that it assures that any burst of output current it produces will have a significant time duration, since it will take at least .1 second for the ramp generator 32 to reduce the applied voltage $E_1$ by the minimum amount (.02 volt) required to turn the SCR off. This feature is particularly useful when the output current from terminals 54 is used to drive a motor, since it assures that the output current burst will have sufficient time duration to overcome the inertia, etc. of the motor and produce a usuable control action.

The A.-C. power lines 112 and 114 also supply electrical energy to firing circuit 28 and to the primary winding 118 of the power transformer 80. Secondary winding 120 of this transformer energizes the full-wave rectifier 122 of the D.-C. power supply 48. The output of this rectifier circuit is directed through a pair of series resistors 124 and 126, and a capacitor 128 is provided for filtering purposes. In addition, a Zener diode 130 is connected across the output of this D.-C. power supply in order to maintain its voltage substantially constant.

The D.-C. output across the Zener diode 130 is fed through a pair of resistors 132 and 134 to a second stabilizing circuit consisting of series-connected Zener diodes 136 and 138. The stabilized voltage developed across these Zener diodes is connected through resistors 140 and 142 to the remote terminals of the set point potentiometers 30 and 34, and the common point 144 between these diodes is connected to the common point 38 between the set point potentiometers. Resistors 146 and 148 are associated with set point potentiometer 30 for the purpose of adjusting the "zero point" and "span" of firing circuit 22 and, similarly, resistors 150 and 152 are associated with the potentiometer 34 for firing circuit 28.

In some applications it may be desirable to mechanically connect the movable arms of the set point potentiometers 30 and 34 so that by a single adjustment both of these potentiometers can be altered in synchronism. Quite often, however, it will be desirable to adjust these potentiometers separately to different voltages, for example, to provide a gap between the firing points of the two firing circuits 22 and 28. That is, it may be desirable to set potentiometer 30 so that firing circuit 22 will fire only when the measured process condition has deviated 1% above the desired value, and to set potentiometer 34 so that firing circuit 28 will fire only when the measured process condition has deviated 1% below the desired value. This provides a "dead band" in which no output signal is produced and therefore prevents continuous energization of the controlled equipment. Moreover, it may be necessary in some circumstances to alter the magnitude of this gap with changes in the set point for the process condition, particularly if the process has non-linear characteristics that can be compensated for in this manner.

In summary, firing circuit 22 or 28 supplies as an output a periodic series of bursts or trains of current pulses which are amplified and converted into a useful form and are used to drive a motor, ring a bell or do other useful work. Because of the use of the ramp voltage in controlling each firing circuit, the duration of each of the periodically-recurring bursts or trains is a function of the magnitude of the difference between the measured input signal and the set-point signal. This means that the measured input signal can be adjusted in steps small enough to prevent overcorrection and "hunting" of the controller. The provision of an adjustable positive feedback supply in each firing circuit provides means for ensuring that each burst of current will have a duration sufficient to perform a useful amount of work. The use of silicon diodes in the bias circuits for the SCR's firing circuits 22 and 28 provides accurate compensation for temperature-sensitive changes in the electrical characteristics of the SCR's. These diodes also limit the control current flowing to the SCR's. Finally, a difference may be set up between the voltages at which each of the circuits 22 and 28 fires so that a "dead band" can be created in which no output signal is produced. This prevents continuous energization of the motors or other equipment being controlled.

The firing circuits 22 and 28 described herein are of the type that "fire" when the applied voltage $E_1$ or $E_2$ is a positive-going gate signal, i.e. when the applied voltage changes from negative polarity to positive polarity. It will be obvious to one skilled in the art, however, that basically similar firing circuits can, if desired, be arranged to fire on negative-going gate signals, e.g. by utilizing the particular circuit connections of the commercially available SCR elements intended for firing with negative-going gate signals. For example, an alarm instrument may consist of two SCR firing circuits, one which is activated if the measurement signal increases to an upper preset level, and the other of which is activated if the signal decreases to a lower preset level. Accordingly, in the description and claims herein, when reference is made to the signal "reaching" or "exceeding" a preset value, or equivalent terminology, it will be understood to mean that the signal may be either positive-going or negative-going.

Although a specific preferred embodiment of the invention has been set forth in detail, it is desired to emphasize that this is not intended to be exhaustive or necessarily limitative; on the contrary, the showing herein is for the purpose of illustrating the invention and thus to enable others skilled in the art to adapt the invention in such ways as meet the requirements of particular applications, it being understood that various modifications may be made without departing from the scope of the invention as limited by the prior art.

I claim:

1. Apparatus for producing an electrical output signal when an electrical signal input to said apparatus reaches a predetermined value, said aparatus comprising, in combination, a controlled rectifier element, an electrical power supply connected to said element, output circuit means connected to said element and said power supply, and control means connected to said controlled rectifier element for causing said element to conduct current from said power supply to said output circuit means when said input signal reaches said predetermined value, said control means including a semiconductor device having across it a voltage drop which varies with changes in operating temperature of said apparatus in substantially the same manner as does the threshold value of the voltage that must be applied to said controlled rectifier element to cause it to conduct.

2. Apparatus as in claim 1 in which said controlled rectifier element is a silicon controlled rectifier element and said semiconductor device is a silicon diode, and including a temperature compensating bias network comprising a variable-bias voltage supply connected in series with said silicon diode, and means including said silicon diode for limiting the current flow from said control means to said silicon controlled rectifier.

3. Apparatus for producing an electrical output signal in response to the introduction into said apparatus of an electrical input signal having a predetermined value, said apparatus comprising, in combination, a controlled rectifier element connected to conduct current from an electrical power supply to output circuit means connected to said element, and control means connected to said controlled rectifier element for causing said element to conduct current from said power supply to said output circuit means when said input signal reaches said predetermined value, said control means including feedback means responsive to the signal supplied to said output circuit means for maintaining the flow of said current until said input signal has receded from said predetermined value by a pre-selected amount and further means for setting the value of said pre-selected amount, said controlled rectifier element switching into a non-conductive state substantially when said input signal has receded from said predetermined value by said pre-selected amount.

4. Apparatus for producing an electrical output signal in response to the introduction into said apparatus of an electrical input signal having a magnitude which equals or exceeds a predetermined value, said apparatus comprising, in combination, a silicon controlled rectifier element, an electrical power supply connected to said element, output terminal means connected to said element and said power supply, and control means connected to said controlled rectifier element for causing said element to conduct current from said power supply to said output terminal means when said input signal reaches said predetermined value and maintaining the flow of said current until said input signal has receded from said predetermined value by a certain pre-selected amount, said control means including feedback means energized by the flow of current to said output terminals for producing and feeding back a signal to said controlled rectifier element to maintain it in a conducting state until said input signal has receded from said predetermined value by said pre-selected amount, a bias voltage supply network for said controlled rectifier element, input terminal means for receiving said input signal, and set point supply means for developing an electrical signal having said predetermined value, said feedback means, said bias network and said input terminals being connected together in series with their voltages adding to one another and being connected in series with said set point supply with their voltages opposing that of the set point supply.

5. Industrial process control apparatus for producing periodically an electrical output signal in response to the introduction into said apparatus of an electrical input signal having a magnitude which equals or exceeds a pre-selected value, the duration of said output signal being a function of the amount by which the magnitude of said input signal exceeds said pre-selected value, said apparatus comprising, in combination; a controlled rectifier element, an electrical power supply for producing current flow through said element, output terminal means connected to said element and said power supply, a generator for supplying an electrical signal varying periodically as a function of time, and control means connected to said generator and said controlled rectifier element for causing said element to conduct current from sai said power supply to said output terminal means during such time as said input signal and said generator signal co-act to produce a gate signal which equals or exceeds the firing voltage from said element.

6. Apparatus for producing periodically an electrical output signal in response to the introduction into said apparatus of an electrical input signal having a magnitude which deviates from a pre-selected value, the duration of said output signal being a function of the amount by which the magnitude of said input signal deviates from said pre-selected value, said apparatus comprising, in combination; a pair of firing circuits each of which includes; a silicon controlled rectifier element, an electrical power supply connected to said element, output terminal means connected to said element and said power supply; a ramp signal generator; and control means connected to said generator and said controlled rectifier element of each of said firing circuits for causing said element to conduct current from said power supply to said output terminal means when the sum of said input signal and said ramp signal deviates from said pre-selected value by a preset dead-band voltage and then causing said element to stop the flow of said current when said sum has been returned beyond said pre-selected value by a predetermined amount of continued firing voltage, said control means including feedback means in each of said firing circuits energized by the flow of current to said output terminals for producing and feeding back a signal to each of said controlled rectifier elements to maintain that element in a conducting state until said sum has been returned beyond said pre-selected value by said predetermined amount, a bias voltage supply network for each of said controlled rectifier elements, input terminal means for receiving said input signal, and set point supply means for developing an electrical signal having said predetermined value, said feedback means, said bias network and said input terminals being connected together in each of said firing circuits in series with their voltages adding to one another and being connected in series with said set point supply with their voltages opposing that of said set point supply, each of said bias networks including a silicon diode having across it a voltage drop which varies with changes in operating temperature of said apparatus in substantially the same manner as does the minimum value of the voltage that must be applied to the corresponding silicon controlled rectifier element to cause it to conduct, and a pair of variable bias voltage supplies each of which is connected in series with said silicon diode.

References Cited by the Examiner

Solid State Products Inc., bulletin D410–02, March 1960, page 9, Fig. 7.

ARTHUR GAUSS, *Primary Examiner.*